United States Patent [19]
Hege

[11] Patent Number: 5,938,319
[45] Date of Patent: Aug. 17, 1999

[54] VEHICLE HEADLIGHT WITH ADJUSTING MEANS FOR DIFFERENT TRAFFIC CONDITIONS

[75] Inventor: Guenter Hege, Gomaringen, Germany

[73] Assignee: Robert Bosch GmbH, Stuttgart, Germany

[21] Appl. No.: 08/665,249

[22] Filed: Jun. 17, 1996

[30] Foreign Application Priority Data

Aug. 16, 1995 [DE] Germany .......................... 195 30 008

[51] Int. Cl.$^6$ .................................................. B60Q 1/00
[52] U.S. Cl. .................... 362/459; 362/466; 362/467; 362/513; 362/514
[58] Field of Search ................... 362/459, 466, 362/467, 513, 514

[56] References Cited

U.S. PATENT DOCUMENTS

| 4,768,135 | 8/1988 | Kretschmer | 362/66 |
| 5,805,119 | 9/1998 | Erskine et al. | 345/7 |

FOREIGN PATENT DOCUMENTS

3843032 A1  6/1990  Germany .

Primary Examiner—Sandra O'Shea
Assistant Examiner—Ronald E. Delgizzi
Attorney, Agent, or Firm—Michael J. Striker

[57] ABSTRACT

The headlight has a light source (10) and a reflector (12) by which light is reflected to a light guiding or deflecting device (18). The light guiding device (18) has a number, advantageously from a few hundred to a hundred thousand, of individual reflecting elements (22) which are movable independently of each other between at least two different positions. Each reflecting element (22) is connected with an electrically operable adjusting element (26) which is controlled by a controller (30). The light reflected from the reflector (12) is reflectable from the light guide device (18) to form a light beam issuing from the lighting device. Reflected light from each reflecting element (22) in one of its positions forms a part of the light beam and does not contribute to the light beam in one of its other positions. Predetermined portions of the light beam can be switched on or off by controlling the individual light reflecting elements (22) and thus can change the characteristics of the light beam issuing from the lighting device.

16 Claims, 3 Drawing Sheets

VEHICLE HEADLIGHT WITH ADJUSTING MEANS FOR DIFFERENT TRAFFIC CONDITIONS

BACKGROUND OF THE INVENTION

The present invention relates to a lighting device for a vehicle, particularly a motor vehicle and, more particularly, to a motor vehicle headlight.

A lighting device for a motor vehicle is known and described in German Published Patent Application 38 43 032 A1. This lighting device has a light source and a reflector, by which light issuing from the light source is reflected. A reflection guiding device is arranged in the path of the light reflected from the reflector, by which the light reaching it is reflected to form a light beam issuing from the lighting device. The light guiding device is stationary so that only a light beam with unique characteristics, which means spread and/or range, etc, can be produced. However an optimum illumination of the traffic situation in front of the vehicle is not possible with a light beam having unique characteristics under all conditions, for example, under different weather or road conditions, so that compromises must be made. Different embodiments of the lighting device were required for left and right handed traffic which results in a comparatively high manufacturing expense.

SUMMARY OF THE INVENTION

It is an object of the present invention to provide an improved lighting device of the above-described type for a vehicle which does not have the above-described disadvantages.

It is another object of the invention to provide a lighting device for a vehicle of the above-described type that has the advantage that the characteristic of the light beam issuing from the lighting device can be varied in a simple manner over a wide range by appropriate motion of the individual reflecting elements of the guide device.

According to the invention, the lighting device for a vehicle, especially a motor vehicle, comprises at least one light source, at least one reflector by which light issuing from the at least one light source is reflected along a light path, and a reflecting means for guiding light, which is arranged in the light path of the light reflected from the at least one reflector. The reflecting means comprises a plurality of individual reflecting elements and means for moving the reflecting elements independently of each other between at least two predetermined positions.

The lighting device according to the invention has the advantage that the characteristics of the light beam issuing from the lighting device can be varied in a simple manner over a wide range by appropriate motion of the individual reflecting elements of the reflecting means. Thus an adjustment of the characteristics of the light beam to different conditions and to right hand traffic and left hand traffic may be performed with a single lighting device, namely a lighting device according to the invention.

The lighting device according to the invention has many advantageous embodiments. Each reflecting element in at least one of its positions advantageously reflects light to form a part of a light beam issuing from the lighting device with light reflected therefrom and in at least one of its other positions advantageously reflects light so as to not contribute to the light beam issuing from the lighting device. In this way any desired lighting pattern may be produced in front of the vehicle. In a preferred embodiment the reflecting elements are at least approximately planar making their manufacture comparatively easy. A controller is advantageously provided to operate electromagnetic or piezoelectric adjusting elements which position the respective reflecting elements. At least one lens is arranged to receive reflected light from the reflecting means for guiding light.

A preferred embodiment of the lighting device includes means for controlling and varying dwell times of the reflecting elements in one of their predetermined positions according to predetermined light intensities to be produced therefrom and means for providing comparatively shorter time intervals between the predetermined positions of the reflecting elements so that the characteristics of the light beam in the respective illuminated regions can be varied over a wide range. Also the light intensities in different regions of the traffic conditions can be arbitrarily varied.

In a further embodiment of the lighting device the means for illuminating each of the individual reflecting elements with different light intensities of the reflected light from the at least one reflector and the reflecting elements illuminated with the greatest light intensities form a certain portion of the light beam illuminating a region comparatively far in front of the vehicle so as to provide a comparatively long range for the light beam.

In another preferred embodiment the lighting device includes means for detecting and processing a traffic condition in front of the vehicle to provide a control signal, the means for detecting and processing including sensor means for detecting one portion of the traffic condition after the other and means for synchronizing motions of the reflecting elements and the sensor means so that that portion of the traffic condition detected immediately by the sensor means is illuminated by the reflected light from at least one reflecting element. Thus, even in dim light, the means for detecting and processing the traffic situation can reliably detect objects in front of the vehicle.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figure 1:
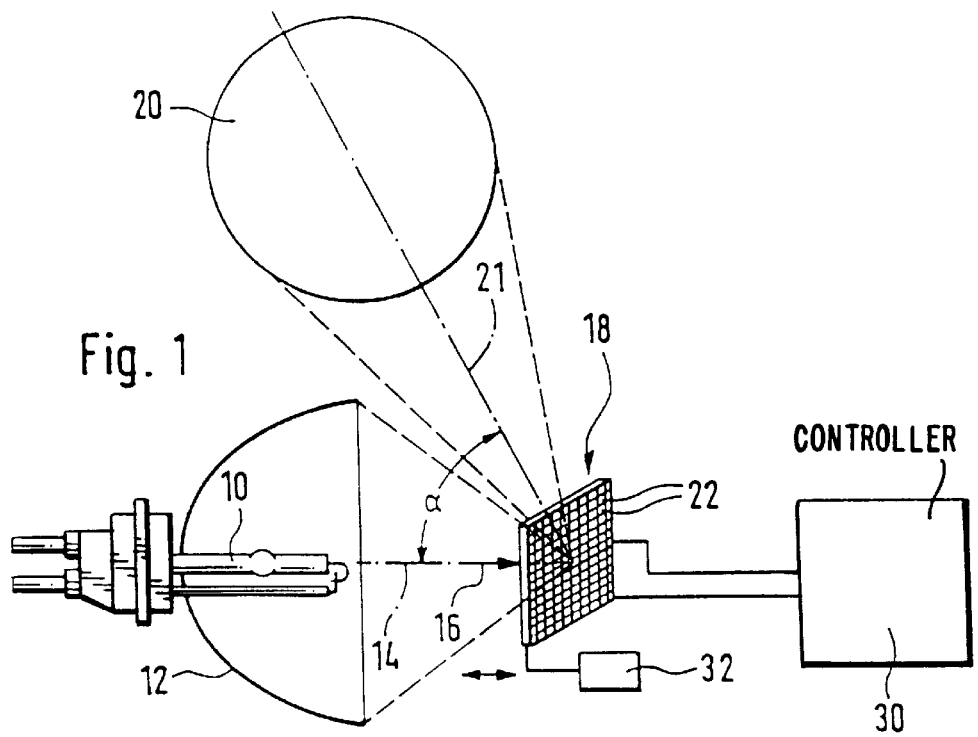
FIG. 1 is a simplified diagrammatic representation of a lighting device for a vehicle according to the invention.

A lighting device for a vehicle, especially a motor vehicle, according to the invention is shown in FIG. 1 and can be used as a headlight or as a light. The lighting device has at least one light source 10, which can be an incandescent lamp, gas discharge lamp or another type of light. The light source 10 is used in a reflector 12, which can have the shape of a paraboloid, an ellipsoid or some other shape. The light source 10 is located advantageously at least close to the optic axis 14 of the reflector and close to its inner focal point. Light originating from the light source 10 is reflected by the reflector 12 in light propagation direction 16. A reflecting means for guiding light, i.e. light guiding device 18, is arranged downstream of the reflector 16 in the light propagation direction 16 in the path of the light reflected from it. The light guiding device 18 is arranged so as to be inclined with respect to the optic axis 14 of the reflector 12 so that light reaching it and reflected by it from the reflector 12 is propagated in a direction inclined to the optic axis 14. A lens 20 by which the light passing through it is controlled so that it is deflected and/or spread and/or converged is arranged in the vicinity of the path of the light rays reflected from the light guiding device 18. The lens 20 is formed so that the light rays reflected from the guiding device 18 are controlled so that they form a light beam illuminating the traffic conditions in front of the vehicle in a suitable way after passing through the lens 20. The optic axis 21 of the lens 20 intersects the optic axis 14 of the reflector 10 at an angle $\alpha$. The angle a can be flexibly adjusted to fit the lighting device to the structural conditions in the vehicle.

Figure 2A:
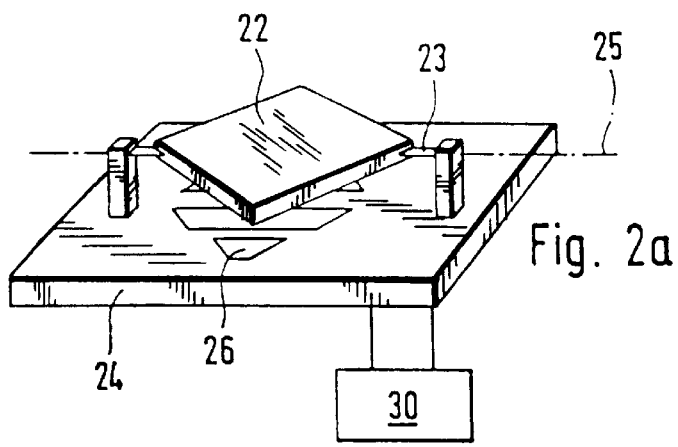
FIG. 2a is a detailed perspective view of a cutaway portion of one embodiment of a light guiding device from a lighting device according to the invention.
Figure 2B:
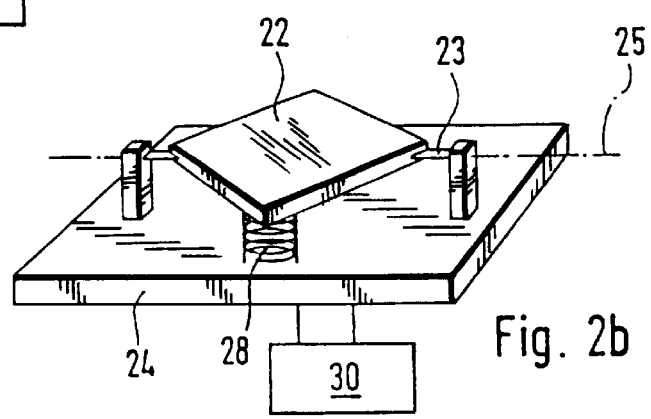
FIG. 2b is a detailed perspective view of a cutaway portion of another embodiment of a light guiding device from a lighting device according to the invention.

The light guiding device 18 has a plurality of individual reflecting elements 22 as shown in FIGS. 2a and 2b, which, for example, are arranged on a common support 24. The reflecting elements 22 are movable independently of each other and between two definite positions relative to the support 24. The reflecting elements 22 are advantageously formed as plane mirrors. From a few hundred to a few hundred thousand individual reflecting elements 22, advantageously a few thousand to a few tens of thousands, of these individual reflecting elements 22 are provided. Each reflecting element 22 is for example movable between its two positions by an electromagnetic adjusting element 26 shown in FIG. 2a associated with it. The light guiding device 18 is formed as a "so-called" DMD, digital mirror device, as described in the German publication, Elektronik, Heft (Volume) 20/1993, pp. 30 to 32. The detailed structure of the light guiding device 18 is described in this reference. The reflecting element 22 is for example arranged on support 24 so as to be pivotable about an axis 25 and is electrically conductive so that an electromagnetic force acts on the reflecting element 22 when a voltage is applied to the adjusting element 26. The reflecting element 22 can be mounted, e.g., by one or more torsion members 23 on the support 24, which are elastically deformed on motion of the reflecting element 22 and produce a restoring force, by which the reflecting element 22: is moved back again into its initial position when the voltage is; no longer applied to the adjusting element 26 in the voltageless state. According to whether or not a voltage is applied to the electromagnetic adjusting element 26 and which polarity this voltage has, the reflecting element 22 is moved by the electromagnetic force acting between the adjusting element 26 and the reflecting element 22 into one of its predetermined positions. Alternatively in the embodiment shown in FIG. 2b, each reflecting element 22 can also be moved by a piezo-electric adjusting element 28 between its at least two predetermined positions shown in FIG. 2b. The piezo-electric adjusting element 28 is coupled with the reflecting element 22 and changes its extension or elongation on application of an electrical potential to it whereby the motion of the reflecting element 22 is produced. An electrical controller 30 is provided for control of the adjusting elements 26 and/or 28, which is connected jointly with adjusting elements 26,28 and which activates some of the adjusting elements of selected reflecting elements 22.

Each reflecting element 22 is arranged in one of its predetermined positions so that the light reflected by it does not pass through the lens 20, but passes by it and does not contribute to the light beam issuing from the lighting device. In its at least one additional predetermined position each element 22 is arranged so that light reflected by it passes through the lens 20 and does contribute to the light beam issuing from the lighting device. Each element 22 thus can form a predetermined part of the light beam issuing from the lighting device by the light reflected from it and illuminates a certain portion of the traffic situation in front of the vehicle. By switching of individual elements 22 between their at least two positions desired regions of the light beam originating from the lighting device can be switched on or shut off and thus a light beam of different variable characteristics can be produced. The reflecting elements 22 can be movable also between different positions in which some of the light reflected from them passes through the lens 20 however propagates in different directions and, because of that, is controlled differently by passage through the lens 20 so that the light beam issuing from the lighting device has changeable characteristics.

Figure 3:
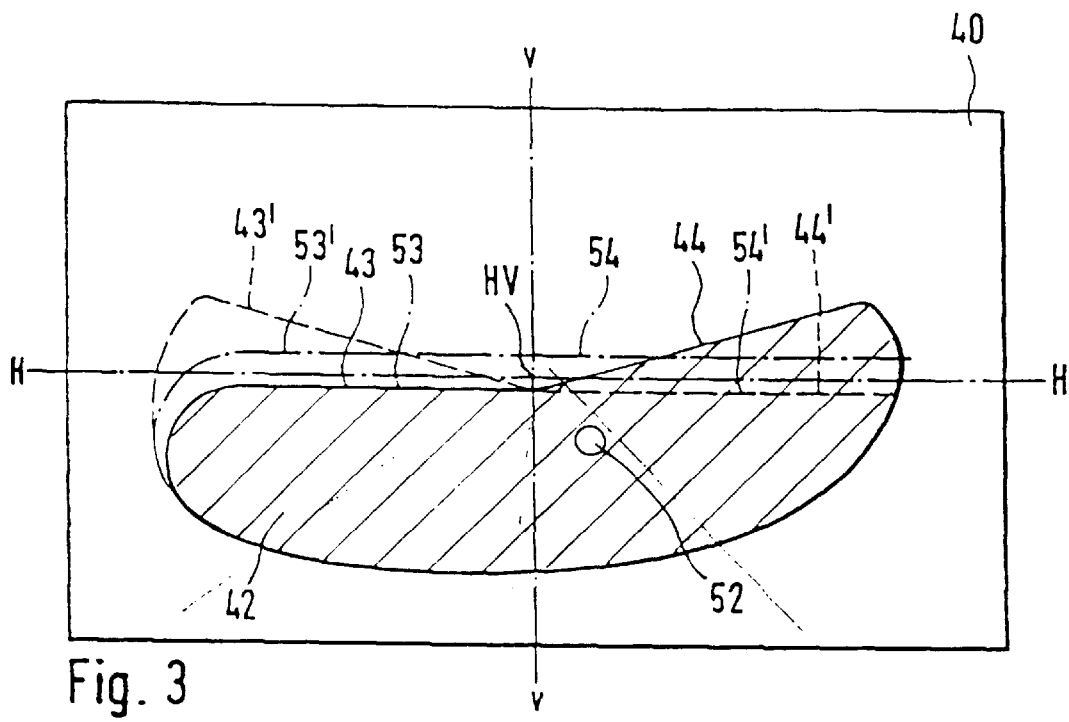
FIG. 3 is a plan view of a measuring screen arranged in front of the lighting device illuminated by several light beams issuing from the lighting device with different intensity distributions.
Figure 4:
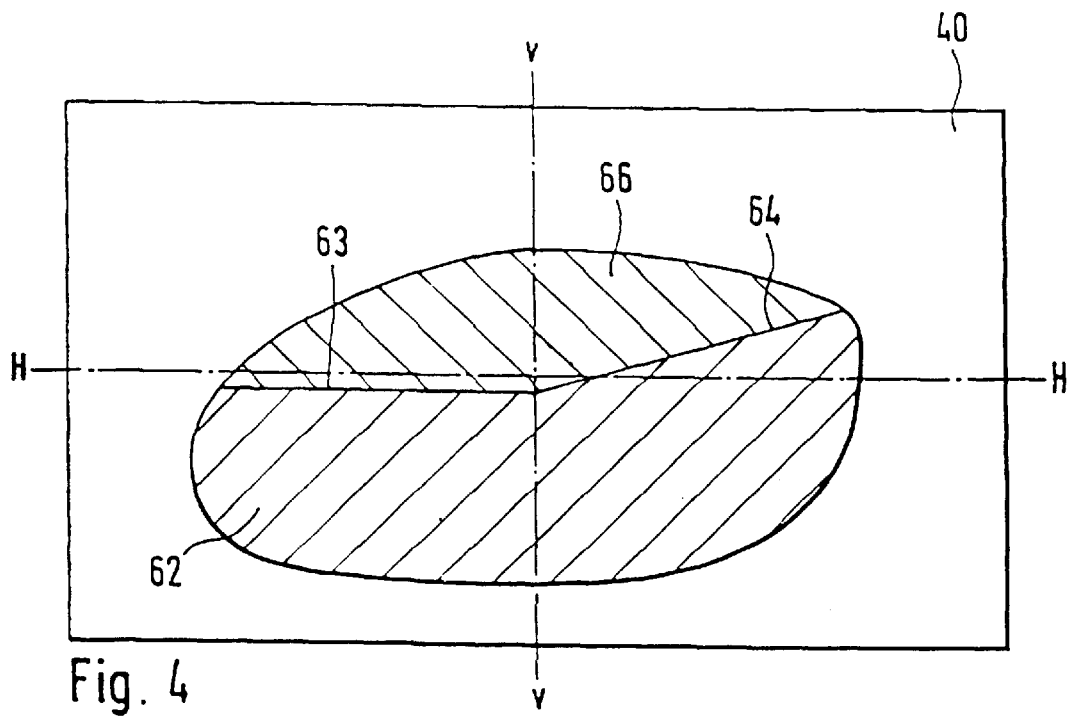
FIG. 4 is a plan view of a measuring screen arranged in front of the lighting device illuminated by additional light beams issuing from the lighting device with different intensity distributions.

A measuring screen 40 arranged in front of the lighting device is shown in FIGS. 3 and 4, which shows the projection of the traffic situation in front of the vehicle and the light beam issuing from the lighting device. The vertical central plane of the measuring screen is indicated with V—V and its horizontal plane with H—H. The lighting device can for example be used for right hand traffic by producing an asymmetric low beam for right hand traffic which illuminates the measuring screen 40 in a region indicated with 42 in FIG. 3. The region 42 is not illuminated with a uniform light intensity but the light intensity decreases to its lateral edges and to its lower edge. Advantageously the light intensity of the region 42 just below the light-dark boundary 44 on the vehicle's own traffic side and close to the vertical central plane V—V is greatest in a region or portion 52 of the measuring screen 40. This portion 52 is designated as measuring point E75R in a so-named ECE (European Economic Commission) regulation. The region 42 is bounded above on its left, which means the side opposing or oncoming traffic side, by a horizontal light-dark boundary 43 and on the right side, which means its own traffic side, by a light-dark boundary 44 which continues from the horizontal light-dark boundary 43 and which rises toward the right measuring screen edge. To make this asymmetric low beam light the reflecting elements 22, whose reflected light illuminates the region 42 after passing through the lens 20, are arranged in their configuration or positions in which their reflected light passes through the lens 20. The remaining reflecting elements 22, whose reflected light would illuminate a region outside of the region 42 after passing through the lens 20, are located in a configuration or positions, in which the reflected light does not pass through the lens 20. Switching to an asymmetric low beam for left hand traffic occurs, when those reflecting elements 22, whose reflected light illuminates a region above the horizontal light-dark boundary 44' on the right side of the measuring screen 40 are moved into another position in which their reflected light no longer passes through the lens 20, and when those reflecting elements 22 whose reflected light would illuminate the left side of the measuring screen 40 above the horizontal light-dark boundary 43 are moved into their position or configuration in which their light passes through the lens 20. Because of that, the region 42 is bounded on its right side by the horizontal light-dark boundary 44' and on the left side by the rising or upwardly inclined light-dark boundary 43'.

Likewise one can switch between asymmetric low beam light for right hand traffic and for left hand traffic, in which a region 42 is illuminated on the measuring screen 40, to a beam which is bounded on both sides by a horizontal light-dark boundary 53,54 indicated by the dot-dashed lines on both sides of FIG. 3 so that the light-dark boundary is arranged somewhat higher on the vehicle's own traffic side than on the opposing traffic side of the vehicle. The switching occurs as previously described, in which the reflecting elements 22, whose reflected light would illuminate the measuring screen 40 above the light-dark boundaries 53,54, are moved into their alternative positions or configuration. To make the low beam for the left hand traffic, in which the light-dark boundary 53' arranged on the left side of the measuring screen 40 is higher than the light-dark boundary 54' on the right side, those reflecting elements 22 whose reflected light illuminates the region between the light-dark boundaries 53 and 53', are moved into the positions or configuration in which their reflected light passes through the lens 20, and those reflecting elements 22, whose reflected light would otherwise illuminate the region between the light-dark boundaries 54 and 54' are moved into the positions or configuration in which their reflected light does not pass through the lens 20.

The above-described switching of individual reflecting elements 22 between their different positions can be caused by operation of a switching element by the driver of the vehicle, which produces the required motion of the reflecting elements 22 via the electrical controller 30. However the light emitting body of the light source, which means the filament of the incandescent lamp or the arc of the gas discharge lamp, does not uniformly illuminate all reflecting elements 22. The reflecting elements 22, which are illuminated with a higher light intensity, are advantageously used to illuminate the region of the measuring screen 40, which should be illuminated with a higher light intensity. High light intensities are especially desirable in the portion 52 of the region 42 of the measuring screen 40. This region corresponds to the region in front of the vehicle which is comparatively far from the traffic.

The above-described structure of the lighting device allows the same embodiment to be used for the right hand traffic and the left hand traffic. The mechanical components of the lighting device can thus remain unchanged and the only changes that are necessary are changes in the controller 30 for the reflecting elements 22. This allows the manufacturing expense for the lighting device to be reduced because the controller 30 can have the same structure and the differences can be provided by programming changes.

Switching between low beam light and high beam light is possible by motion of the individual reflecting elements 22 between their different positions or configurations. In FIG. 4 a measuring screen 40 is provided, which is illuminated in a region 62 by an asymmetric low beam light issuing from the lighting device, which is bounded by an upper horizontal light-dark boundary 63 on the opposing traffic side and by an upwardly rising light-dark boundary 64 on the vehicle's own traffic side. In the operating position or configuration of the lighting device for high beam light an additional region 66 of the measuring screen 40 is illuminated above the light-dark boundary 63,64 by the light beam issuing from it. In the operating position for the low beam light those reflecting elements 22, whose reflected light would have illuminated the region 66, are in their position, in which their reflected light does not pass through the lens 20. To switch these reflecting elements 22 into the operating position for high beam light these reflecting elements 22 are moved into their other position in which their reflected light passes through the lens 20.

Predetermined portions of the light beam transmitted from the lighting device can be shut off by predetermined motions of individual reflecting elements 22 so that regions of the measuring screen 40 illuminated by these parts of the light beam are either illuminated or not according to choice. The lateral spread of the light beam and thus the lateral extent of the region illuminated on the measuring screen 40 and/or its downward or upward extent, which means the distance at which the traffic situation is illuminated and/or the range of the light beam, can be varied. The switching of the reflecting elements 22 can be performed by a driver of the vehicle via a switch. Alternatively, however an automatic switching can be provided in which a detecting device can be provided which detects different parameters and the switching of the reflecting elements 22 occurs according to these parameters. For example, the speed of the vehicle can be measured as one such parameter and a switching of the reflecting elements 22 can be performed according to it. For example with increasing vehicle speed the lateral spread of the light beam issuing from the lighting device is reduced. The weather conditions, e.g. rain, snow and fog, can be measured by this device and depending on them a change of the characteristics of the light beam issuing from the lighting device occurs by motion of the reflecting elements 22. The light conditions in front of the vehicle can be measured by this device and according to those conditions the lighting device can be switched between low beam light and high beam light. by motion of the reflecting elements 22. Predetermined values of positions of the reflecting elements 22 for the different measured values of these conditions are generally stored in this device which moves the reflecting elements accordingly.

A motion, particularly a pivoting of the entire light guiding device 18, can be provided in addition to the previously described motions of the individual reflecting elements 22 between their different positions or configurations. A positioning device 32, which can act electromagnetically, piezoelectrically or in other ways like the adjusting elements 26,28 of the individual reflecting elements 22, can act on the support 24 of the guide device 18 as shown in FIG. 1.

Figure 5:
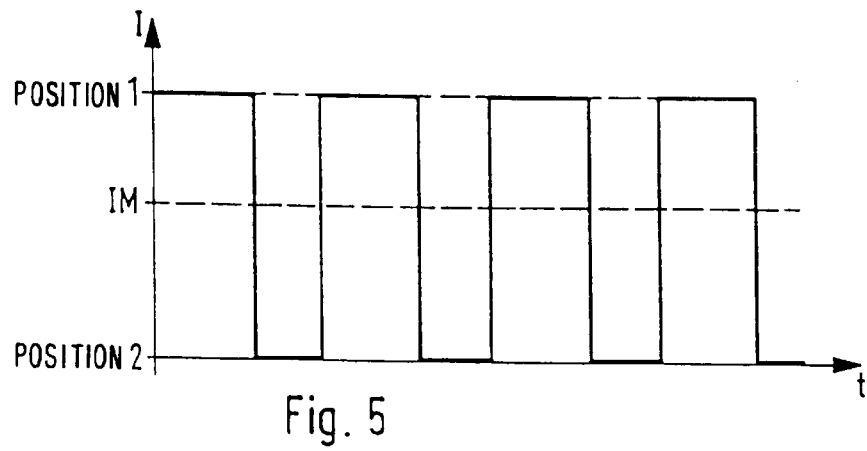
FIG. 5 is a graphical illustration of the dependence of light intensity on time with a reflecting element of the light guiding device moving between two positions.

In other embodiments of the previously described guiding device 18 the reflecting elements 22 are moved by the adjusting elements 26 or 28 continuously during short time intervals between their different positions. The dwell time in the different positions determines the light quantity, which is reflected from those reflecting elements 22 which pass through the lens 20. In FIG. 5 the light intensity change due to the motion of the reflecting elements 22 between both positions 1 and 2 over the time t is illustrated. The light intensity I passing issuing through the lens 20 is determined by the dwell time of the reflecting elements 22 in the position 1 in which their reflected light passes through the lens 20. A predetermined time averaged light intensity IM which passes through the lens 20 results. By changing the dwell time of the elements 22 in the individual positions in which their reflected light passes through the lens 20 the light quantity issuing through the lens 20 can thus be adjusted arbitrarily. Thus the light intensity present in different regions of the measuring screen 40 can be arbitrarily adjusted. It is switchable arbitrarily between complete illumination and no illumination at all. Because of that still other possibilities exist for changing the characteristics of the light beam issuing from the lighting device, since not only can regions of the light beam be completely shut off, but individual parts of the light beam can be changed in their intensity continuously which means that arbitrarily chosen regions of the measuring screen 40 can be illuminated with an arbitrarily selected light intensity.

Figure 6:
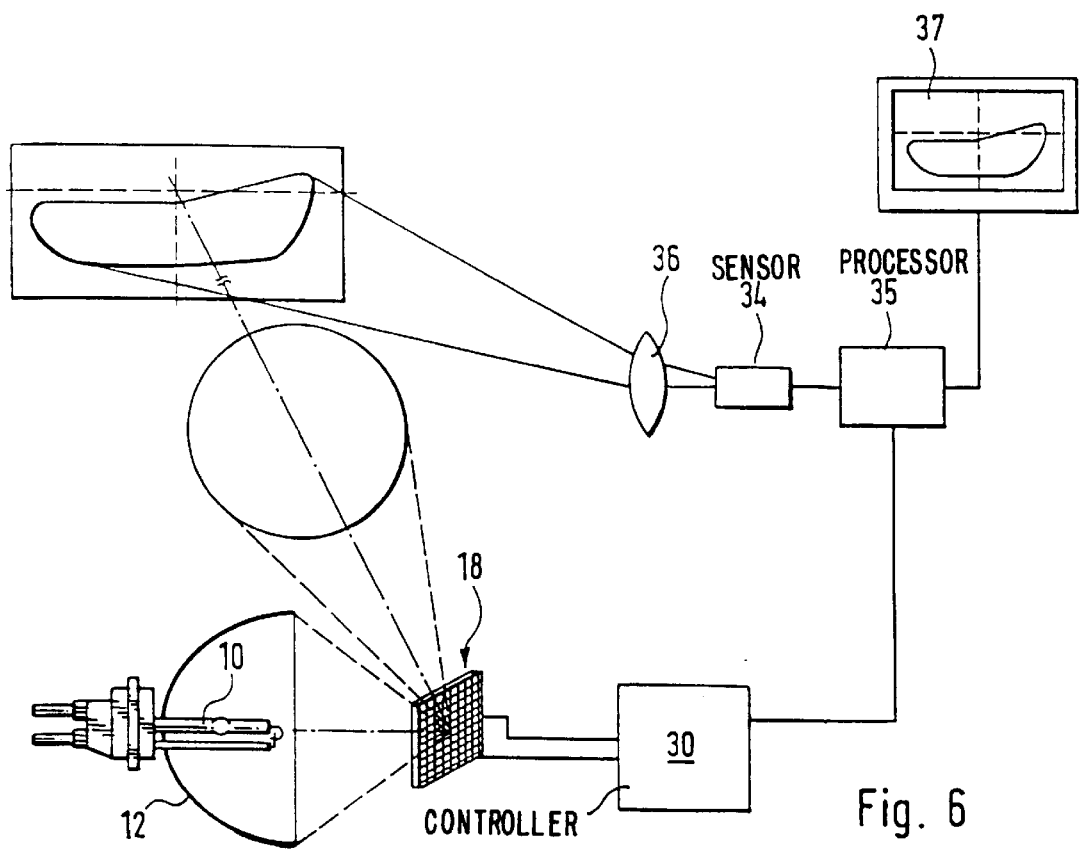
FIG. 6 is a diagrammatic illustration of a combination of the lighting device for the vehicle with a device for detection of the traffic situation in front of the vehicle.

The lighting device formed according to the above paragraph is advantageously combinable with another device by which the traffic situation in front of the vehicle is detected and processed. This other device includes a sensor means 34 as shown in FIG. 6, by which the traffic situation is detected and which is combined with a processor 35 in which the signals of the sensor means are at least amplified. The sensor means can be a plurality of individual sensor elements, which detect a portion of the traffic situation, or it is possible to focus different portions of the traffic situation one after the other on a sensor element by a movable imaging optic device 36. The detection of the traffic situation in front of the vehicle can occur continuously or advantageously periodically, which means for different regions of the traffic situation one after the other, to improve the signal-to-noise ratio. The motion of the reflecting elements 22 in the lighting device and the measurement. of the portions of the traffic situation by the sensor device advantageously occurs synchronously so that each portion is immediately detected when the reflecting elements 22 associated with that portion are arranged in the positions or configuration in which light reflected from them passes through the lens 20 and illuminates this portion. Because of that, a sufficient light intensity is present at the time of detection by the sensor means, also in portions of reduced intensity, on average to be able to produce a strong and noise-free signal in the sensor device 34 which can be fed to the processor 35. In this way portions of the traffic situation in which only reduced light intensities are permitted to avoid blinding the on-coming driver, are reliably analyzed, especially portions of the traffic situation above the light-dark boundary at comparatively large distances in front of the vehicle. Foreign objects found in this far portion of the traffic situation can be detected early. The device can, as shown in FIG. 6, include a signalling device 37, in which an image of the traffic situation processed by the processor 35 and detected by the sensor means 34 can be produced for the driver. The foreign objects seen in the signalling device 37 can be detected substantially earlier by the driver than would be possible by a direct view of the traffic situation. The device can be connected. by a regulating loop directly with the guidance of the vehicle, so that an automatic steering of the vehicle according to the detected traffic situation, which means the road conditions, is possible.

While the invention has been illustrated and described as embodied in a lighting device for a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An adjustable headlight for a vehicle comprising
   at least one light source (10),
   at least one reflector (12) by which light issuing from the at least one light source (10) is reflected along a light path, and
   adjustable reflecting means (18) for forming a light beam illuminating a region in front of the vehicle from said light reflected along said light path by said at least one reflector (12);
   wherein said adjustable reflecting means (18) comprises a plurality of individual adjustable reflecting elements (22) and means for moving said adjustable reflecting elements independently of each other between at least two predetermined positions to adjust said light beam for different conditions present in front of the vehicle;
   whereby the headlight is adjustable for both right hand traffic and left hand traffic.

2. The adjustable headlight as defined in claim 1, wherein each of said adjustable reflecting elements (22) in at least one of said at least two predetermined positions reflects said light to form a part of said light beam and in at least one other of said at least two predetermined positions reflects said light so as not to contribute to said light beam.

3. The adjustable headlight as defined in claim 1, wherein each of said adjustable reflecting elements is at least approximately planar.

4. The adjustable headlight as defined in claim 1, wherein said means for moving said adjustable reflecting elements (22) comprises a plurality of electromagnetically-operated adjusting elements (26) coupled to said reflecting elements (22), wherein each of said electromagnetically-operated adjusting elements (26) is coupled to a different one of said reflecting elements (22) for control of said reflecting elements independently of each other.

5. The adjustable headlight as defined in claim 4, wherein said means for moving said adjustable reflecting elements (22) includes an electrical controller (30) including means for activating each of said adjusting elements (26) independently of each other.

6. The adjustable headlight as defined in claim 1, wherein said means for moving said adjustable reflecting elements (22) comprises a plurality of piezoelectrically-operating adjusting elements (28) linked to said reflecting elements (22), wherein each of said piezoelectrically-operating adjusting elements (28) is linked to a different one of said reflecting elements (22) for control of said reflecting elements independently of each other.

7. The adjustable headlight as defined in claim 6, wherein said means for moving said adjustable reflecting elements (22) includes an electrical controller (30) including means for activating each of said adjusting elements (28) independently of each other.

8. The adjustable headlight as defined in claim 1, further comprising at least one lens (20) arranged to receive light reflected from the reflecting elements (22).

9. The adjustable headlight as defined in claim 8, wherein each of said adjustable reflecting elements (22) is movable between a first position in which the light reflected from the reflecting elements (22) passes through said at least one lens (20) and a second position in which the light reflected from the reflecting elements (22) does not pass through the at least one lens (20).

10. The adjustable headlight as defined in claim 2, further comprising means for controlling a dwell time of said reflecting elements in said at least one position in which said light is reflected to form said part of said light beam according to a predetermined average light intensity to be produced in said part of said light beam and means for controlling a time interval between different ones of said at least one position so that said time interval is shorter than each of said dwell times.

11. The adjustable headlight as defined in claim 10, further comprising means for varying said dwell time and said time intervals between said at least two predetermined positions of said reflecting elements.

12. The adjustable headlight as defined in claim 1, further comprising means for illuminating each of the adjustable reflecting elements (22) with different light intensities of the reflected light from the at least one reflector (12) and wherein the ones of the reflecting elements (22) illuminated with the greatest light intensities form a predetermined portion of the light beam illuminating a region comparatively far in front of the vehicle.

13. The adjustable headlight as defined in claim 12, further comprising means for moving the reflecting means (18) as a whole for deflecting the light reflected from the at least one reflector (12) to change a propagation direction of said light.

14. The adjustable headlight as defined in claim 12, further comprising a switching element for arbitrarily activating motion of the reflecting elements (22) between said at least two predetermined positions.

15. The adjustable headlight as defined in claim 1, further comprising means for controlling said reflecting elements (22) including means for automatically measuring at least one parameter characteristic of at least one of a traffic situation, a weather condition and a vehicle speed of the vehicle containing the headlight and means for moving the reflecting elements into a selected one of the at least two predetermined positions according to said at least one parameter.

16. The adjustable headlight as defined in claim 10, further comprising means for detecting and processing a traffic situation in front of the vehicle to provide a control signal, said means for detecting and processing including sensor means (34) for detecting one portion of said traffic situation after the other and means for synchronizing motions of said reflecting elements (22) and the sensor means (34) so that said portion of said traffic situation detected by said sensor means is immediately illuminated by said light beam.

* * * * *